May 6, 1941. J. VERDERBER Re. 21,795
MACHINE TOOL
Original Filed Feb. 27, 1937 5 Sheets-Sheet 1
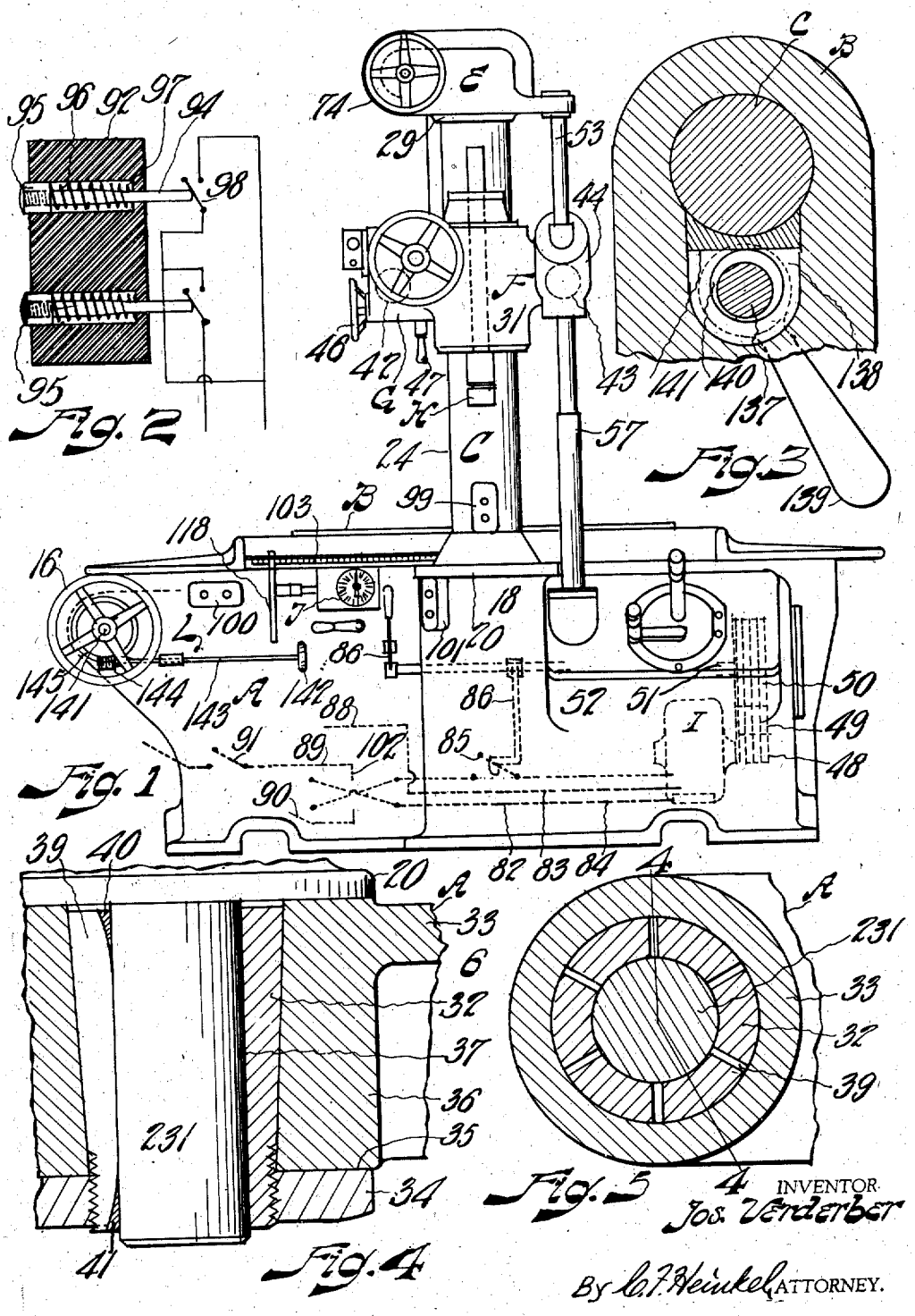
INVENTOR
Jos. Verderber
By C. F. Heinkel ATTORNEY.

May 6, 1941. J. VERDERBER Re. 21,795

MACHINE TOOL

Original Filed Feb. 27, 1937, 5 Sheets-Sheet 2

INVENTOR.
Jos. Verderber

By C. F. Heinke ATTORNEY.

May 6, 1941. J. VERDERBER Re. 21,795

MACHINE TOOL

Original Filed Feb. 27, 1937 5 Sheets-Sheet 3

INVENTOR.
Jos. Verderber

By L. F. Heinkel ATTORNEY.

May 6, 1941. J. VERDERBER Re. 21,795

MACHINE TOOL

Original Filed Feb. 27, 1937 5 Sheets-Sheet 4

INVENTOR
Jos. Verderber

By C. F. Heinke ATTORNEY.

May 6, 1941. J. VERDERBER Re. 21,795

MACHINE TOOL

Original Filed Feb. 27, 1937 5 Sheets-Sheet 5

INVENTOR,
Jos. Verderber

BY

C. F. Heinkel
ATTORNEY.

Reissued May 6, 1941

Re. 21,795

UNITED STATES PATENT OFFICE 21,795

MACHINE TOOL

Joseph Verderber, Cleveland, Ohio

Original No. 2,167,189, dated July 25, 1939, Serial No. 128,201, February 27, 1937. Application for reissue September 25, 1940, Serial No. 358,322

15 Claims. (Cl. 77—4)

The present invention relates to machine structure generally with special reference to economy of structure in parts and easy and convenient setting of related parts and ease and convenience of operating of the machine and relatively setting the parts thereof.

In the prior art, in machines built of parts, especially heavy parts, the practice has been to machine the separate parts and then fit the parts to each other by hand fitting such as scraping and the like but this consumes much time in that parts had to be tested together to find where fitting was necessary; this entails taking the parts from a machine for scraping or the like and then putting them back on again for further testing and this, in most instances, was found necessary to be repeated several times.

In the prior art, in machines wherein parts or elements thereof are adjustably related or permanently connected or joined to each other, the adjusting usually is done by guess work augmented by measuring instruments if available for determining the accuracy of the setting of the parts. This also entails or consumes much time.

The present invention provides an easy and convenient means for forming joints between parts of machines first by forming of the parts so that the same can be machined easily and to correct form and fit so that, for subsequent assembling of the parts, no separate fitting is necessary and second the parts will fit together correctly by and during the assembling of the parts and the machine.

The present invention also provides a means, as a part of a machine, whereby an adjustment of relatively adjustable parts can be read directly by mechanism on the machine and uses individually insertable blocks in the adjusting mechanism. These blocks are made either of special thicknesses to suit particular requirements or of such commercial standard blocks as the well known Johannessen gages. One or more of such gages is inserted into the adjusting mechanism as occasion may require.

The present invention also provides a very precise means for setting of parts of a machine and the setting is permanent and can not change its setting by the operation of the machine until manually released.

Objects of the present invention are:

To provide simple and economical structure in a machine built up of parts and to machine the parts that are to be joined together so that no fitting thereof, manually or otherwise, is necessary after the machining and the joints fit correctly and accurately and precisely for assembling and remain in accurate and precise relations after the assembling.

To provide on the machine a precise means that shows the setting of the parts relative to other parts of the machine.

To provide micrometrically operating and reading means on the machine for relatively movable parts of the machine and locate the same on the outside of the machine where the same are easily read and easily reached and operated for setting.

To provide an economical easily operated control means for moving relatively movable parts of a machine.

To provide an easily controlled power means for operating movable parts of a machine.

Other objects will be pointed out during the following description of the machine shown in the accompanying drawings or will become obvious or apparent or will suggest themselves upon an inspection of this description and the drawings mentioned above.

In the accompanying drawings, mentioned above, showing one type of machine embodying the present invention:

Fig. 1 is a side view of a machine embodying the present invention.

Fig. 2 is a typical sectional view of the push button devices as used on the here shown machine; the section being augmented by a diagrammatical illustration of the wiring for the device.

Fig. 3 is a typical sectional view of a clamping mechanism that can be used in the machine for retaining relatively movable parts thereof in adjusted positions without destroying the precise relations thereof.

Fig. 4 is a sectional view of a typical bushing and mounting thereof for clamping a part to a bed; the section being taken on line 4—4 of Fig. 5.

Fig. 5 is a section taken traversely of Fig. 4.

Similar reference characters refer to similar parts throughout the views.

*Description of the main framing*

Figure 6:
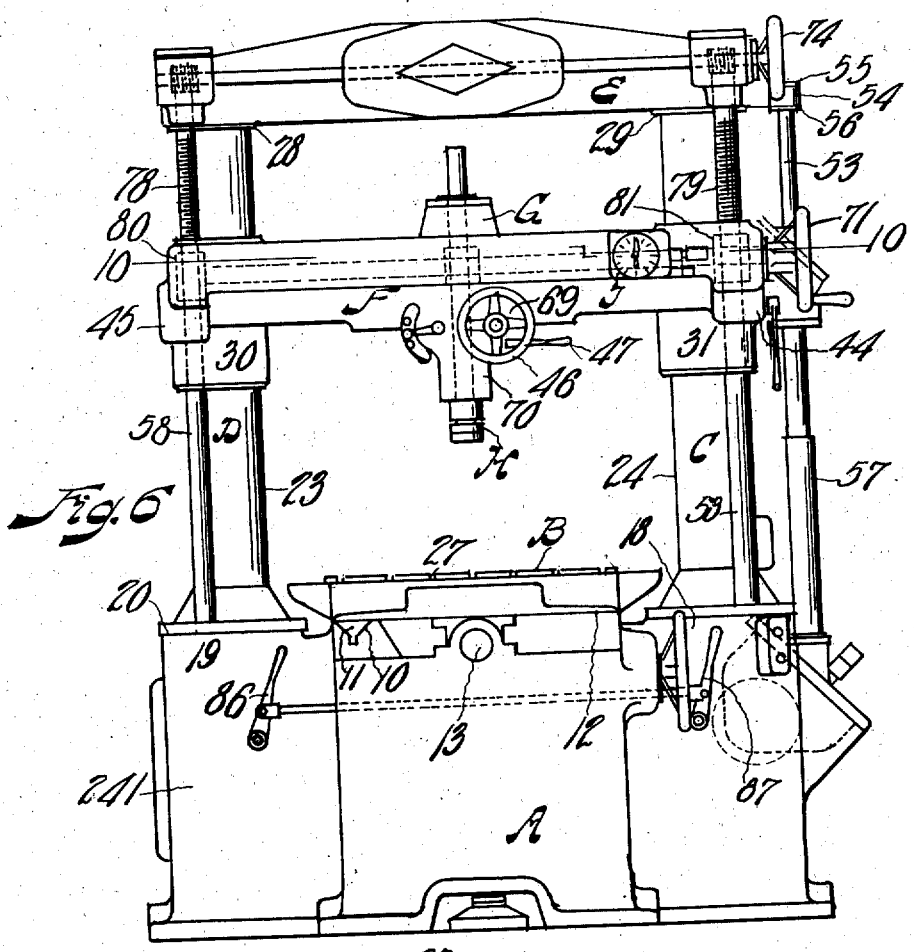
Fig. 6 is a front view of Fig. 1.

The bed or base A is made of suitable material and form, preferably heavy to provide a substantial base for the machine, to receive and support thereon the table B and to guide the table by means of the V shaped groove 10 near one side thereof and the V shaped member 11 fitting the groove and the flat faces or surfaces 12 near the opposite side thereof. The table B is guided to move longitudinally of the bed and is moved longitudinally by means of the screw 13 journaled in the bed and having the gear 14, preferably a spiral gear, secured to one end thereof and meshing with the gear 15 secured to the shaft 141 journaled in the bed and having the handwheel 16 secured to the outer end thereof on the outside of the bed. When desired, for longitudinal movement of the table from either side of the machine, the shaft 141 may be extended clear across the bed and another handwheel secured to the other end thereof. The nut 17 is secured to the underside of the table B and is threaded to the screw 13 so that rotation of either one of the handwheels moves the table longitudinally of the bed. The bosses 18 and 19 are provided on the bed at the sides of the table to receive the posts or columns C and D.

Figure 7:
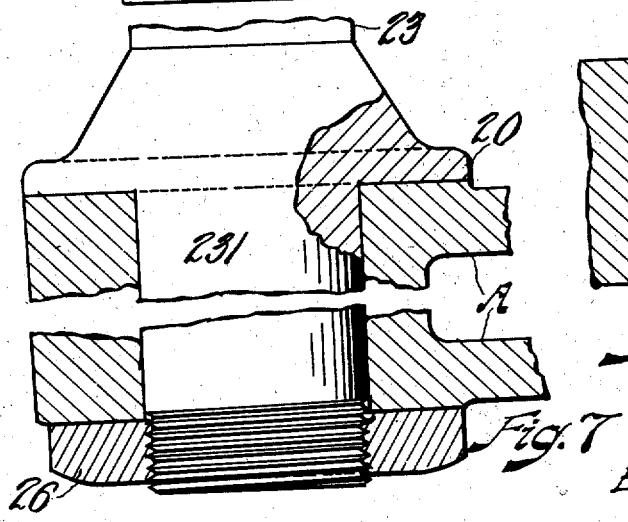
Fig. 7 is a sectional view of a joint between a post and a base to eliminate driving of the post into the base.
Figure 8:
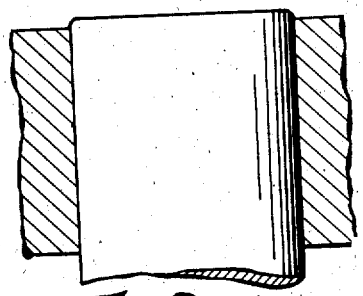
Fig. 8 is a sectional view, typical of the joints of the machine shown in Fig. 1.
Figure 9:
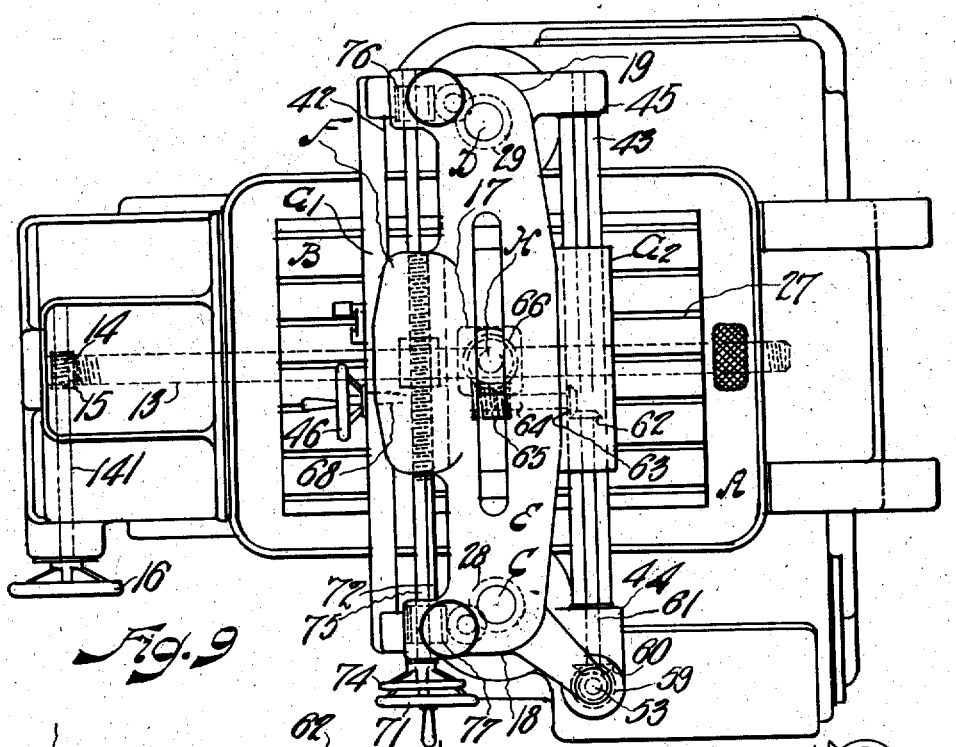
Fig. 9 is a plan view of Fig. 1.
Figure 10:
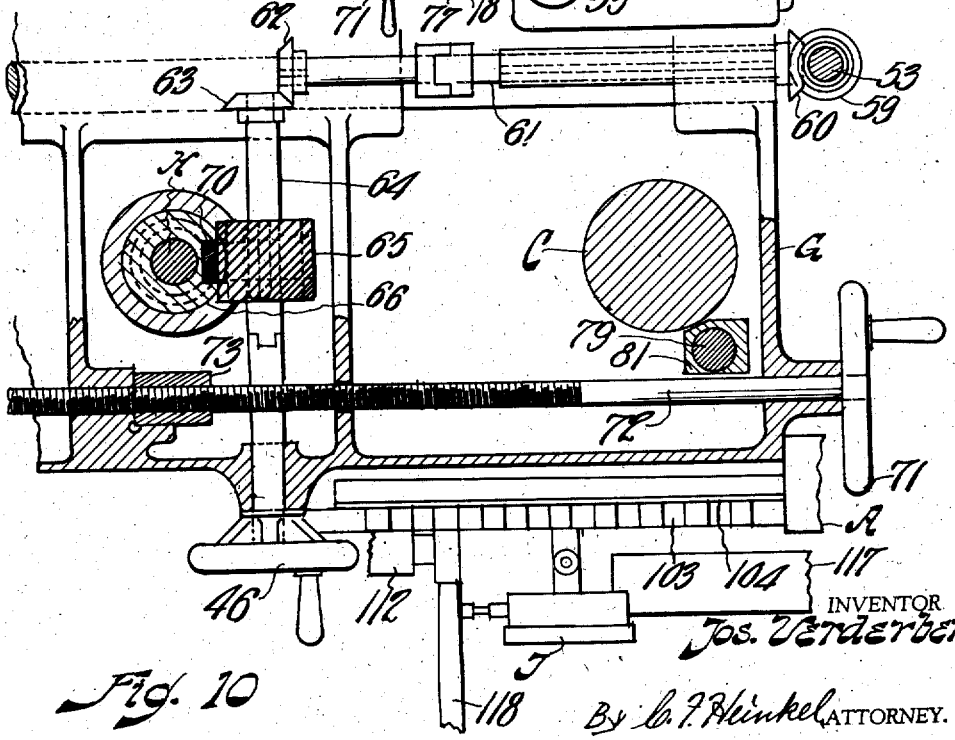
Fig. 10 is a section taken on the line 10—10 of Fig. 6.
Figure 11:
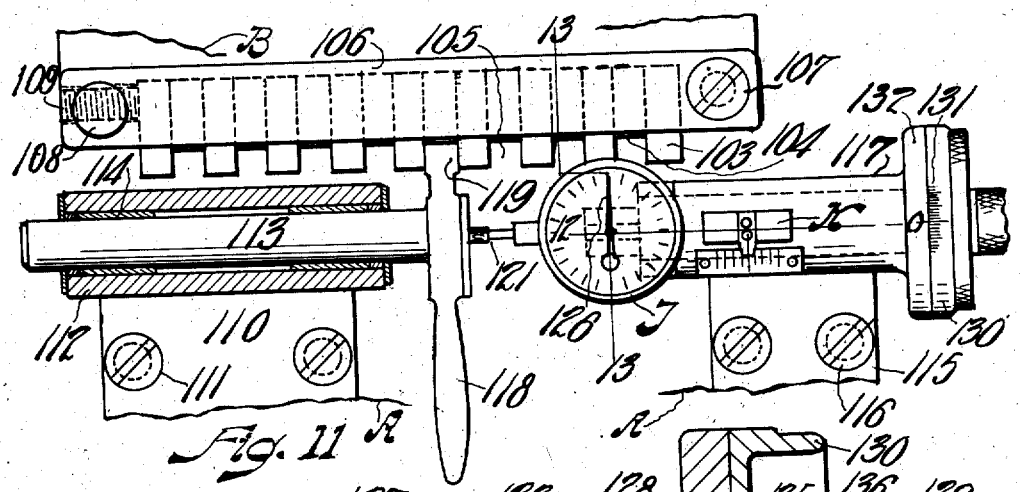
Fig. 11 is a plan view of the micromic setting means on a larger scale.
Figure 12:
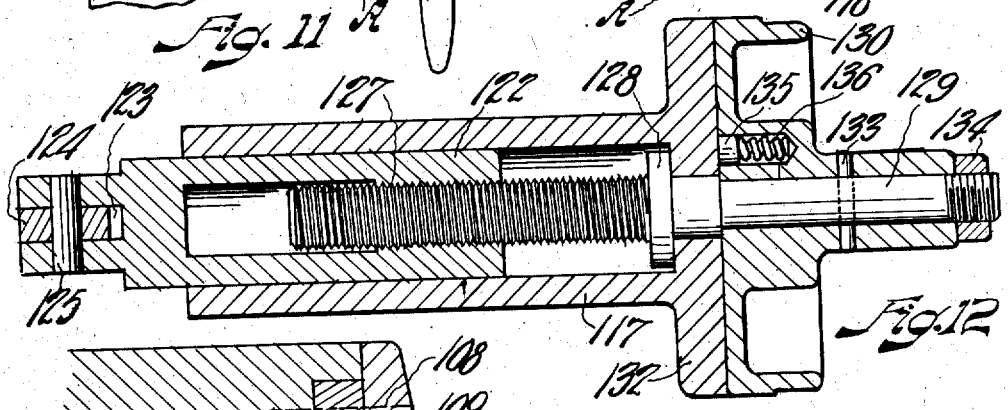
Fig. 12 is an enlarged section taken on line 12 of Fig. 11.

One end of each post extends into the bed preferably by a close fit although the mechanism shown in Figs. 7 and 8 may be used. An essential feature is that the posts are securely held and are parallel with each other.

The collars 20, square with the axes of the posts, are provided on the posts to abut the square upper ends of the bosses to attain squareness of the posts relative to the top of the table B.

The parts 23 and 24 of the respective posts C and D are exactly parallel which parallelism is attained by machining the posts concentrically and boring the holes in the bed for the posts exactly parallel. This machining of the parts 23 and 24 and the boring of the holes in the bed is made accurate so that no additional fitting is necessary for assembling of the parts and the bed.

The upper ends of the bosses 18 and 19 are faced off exactly square with the axis of the bores in the bosses so that the ends of the collars 20 abut thereon and position the posts accurately and hold the same parallel when the ends thereof are in the bosses and held therein.

The posts are spaced sidewise of each other sufficiently far apart to let the table B, or work overhanging one or both sides thereof, to pass between them.

The outer surface of each of the posts is round and is ground concentric and parallel with the axis thereof so that no manual fitting will be necessary thereon when the machine is being assembled. Preferably, the posts are hardened so that the same will better withstand wear and will not bend easily although the below described arrangement of axes in one plane, or nearly so, or substantially so eliminates the tendency to bend the posts in distinction from the prior art wherein the axes are not in or nearly in one plane and thereby cause bending of the posts due to pressure brought on an element not in the same plane as the posts and will also cause one element of the machine to tilt relative to the posts.

The parts 231 and 241 of the posts may be straight or taper, straight being preferred since the boring of the bosses and the machining of the posts is thereby facilitated and the cost of production is minimized. The parts 231 and 241 of the posts may be driven into the respective bosses, preferably by a light drive to avoid springing of the posts by such driving. When desired, especially when the posts are driven into the bosses quite lightly, a nut 26 threaded to the lower end of each may be provided as shown or with a washer between the nut and the boss, the washer to abut the lower end of the corresponding boss and the nut 26 to abut the washer. When this nut arrangement is used for holding the posts in the bed, it can also be used to pull the posts into the bosses and thereby eliminate the danger of bending the posts during the driving thereof into the bosses.

It is preferred that the posts are first machined to a diametrical size that allows for finish machining later, are then hardened by carbonizing or a process commensurate with and adapted to the material used for the posts to harden at least the outer surface thereof and, after the hardening, grinding the same concentric with the axis thereof to finish size including the under face of the collars 20 thereon to be square with the axes of the posts so that the so machined faces abut firmly and fit correctly and the parts 231 and 241 of the posts, being of the same diameter through out the length thereof, are parallel when in the bosses. The bearings of the posts in the bed are quite long to promote parallellism of the posts. This feature is also carried out throughout the machine.

The above mentioned table B can move longitudinally of the bed and is guided in movement by the above mentioned V grooves 10 and V shaped members 11 and the flat surfaces 12 and is moved longitudinally by the above mentioned screw 13 and the mechanism cooperating therewith. The upper part or surface of the table B is shown as having the slots 27 longitudinally thereof for locating and holding work on the table. Transverse slots may also be provided on the table for purposes similar to the first mentioned slots.

The tie bar E may or may not be used and may form a part of the framing when used.

The tie bar E, preferably a casting of suitable material and form and required strength, has the bosses 28 and 29 each near one of the longitudinal ends thereof. Each of the bosses has a bore longitudinally therethrough to either fit closely to the upper ends of the post parts 23 and 24 as shown in Figs. 7 or 8 or to have the bushing structure shown in Figs. 4 and 5 mounted therein.

The above mentioned bushing structure is illustratively shown in Figs. 4 and 5. The object of the tie bar is to retain the upper ends of the posts against bending and to retain the posts parallel. Usually there is no need for a clamping means between the tie bar and the posts when there is a close fit between posts and tie bar. However, when desired, a cam clamping means such as is illustrated in Fig. 3 may be used.

*Description of the machining mechanism*

The cross head F, of suitable material and form and strength, preferably a casting, has the boss 30 on one end thereof and the boss 31 on the other. Each boss has a bore therethrough to either fit the corresponding parts 23 and 24 very closely but slidably or to have the bushing structure shown in Figs. 4 and 5 mounted therein. Lost motion in these joints is to be avoided.

When desired, a cam or equivalent clamping means, such as is illustratively shown in Fig. 3 may be mounted between the cross head and one or both of the posts to prevent the cross head from moving upwardly when a pressure is brought thereon tending to move the same in that direction.

Figs. 4 and 5 illustrate structure whereby very close adjustment can be made between the posts and the cross head and whereby the tie bar may be clamped onto the posts when desired.

In this structure, the outer circumferential surface of the bushing 32 is taper and fits into a correspondingly taper hole in one of the joined parts 33. The lower end of the bushing is externally threaded to receive the nut 34 which abuts the lower face 35 of the boss 36. The bore 37 fits closely to the stem part 231. The bushing is first made of one piece structure and is then slitted by radial cuts 39 extending longitudinally of the bushing. This divides the bushing into individual parts, six being shown, each of which could move independently but the threaded engagement between the nut 34 and the bushing prevents such individual movement and moves all of the individual parts uniformly in an axial direction when the nut is rotated and thereby moves the bushing parts toward or away from the stem part 231 uniformly and neither the adjusting of the joint nor the clamping thereof can move the axis of the part 231 away from its original position.

When the bushing 32 is to be hardened and ground, it is preferred that the slits 39 are not cut clear through to leave the portions 40 and 41 uncut by each slitting or to leave the portion 40 uncut but cut the portion 41 or vice versa or alternate the portion 40 with the portion 41 in the different slits. The object here being to provide and retain just sufficient material between the bushing parts to hold the same together temporarily for hardening and final finish machining thereof. After the bushing is hardened it is ground to finished size with all circular surfaces concentric with the axis of the bushing. After the bushing is finally finished as to machining thereof, the parts thereof are separated by breaking the portions 40 and 41 which may conveniently be done by driving a taper arbor through the bore of the bushing. Other means may be used to separate the bushing parts.

The two bars 42 and 43 have the respective ends thereof mounted in the bosses 44 and 45 by a driving fit or the bushing structure of Figs. 4 and 5 of equivalent means. Each of the bars is preferably hardened and ground and is of the same diameter throughout the length thereof. Both bars are exactly parallel with each other when in place.

The spindle carrying element G has two bosses each either bored to closely fit one end of one of the bars or bored for a means equivalent to the structure illustrated in Figs. 4, 5, 7 and 8 so that the element G can slide longitudinally on the bars and be guided thereby without lost motion.

The spindle H is journaled in and held against axial movement in a quill which is axially movable by a conventional rack and gear mechanism operated by the hand wheel 46 to move the quill and the spindle therein axially.

A locking mechanism 47, such as is illustrated in Fig. 3, may be installed when desired to lock the spindle against axial movement and a similar or equivalent mechanism may be installed to lock the element G against movement longitudinally of the bars 42 and 43.

*Description of the driving means*

The motor I is mounted within the bed A and has the driving pulley 48 on the armature shaft thereof for the belt 49 which connects the same drivingly with the pulley 50 on the shaft 51, the latter entering the gear case 52 and driving a conventional speed change mechanism therein.

The vertical shaft 53 has the lower end thereof in driving connection with the speed change mechanism and the upper end thereof is journaled in the lug 54 extending sidewise from the tie bar E. The shaft 53 is held against axial movement by the collars 55 and 56 secured to the shaft 53 and abutting the lug 54.

The tubes 57 and 58 cover the shaft 53 and the screws to comply with the regulations provided to install protection means for moving parts of machines.

The rotating means for the spindle H is shown as comprising the bevel gear 59 splined to the shaft 53 to move longitudinally thereon and meshing with the bevel gear 60 and rotating the telescopic shaft 61 which rotates the bevel gear 62 meshing with the bevel gear 63 to rotate the shaft 64 and the spiral gear 65 that meshes with the companion gear 66 splined to the spindle H. The spindle H is moved vertically by means of the hand wheel 46 and rotates the shaft 68 and the pinion 69 thereon and meshes with the rack 70 on the spindle carrying quill to move the quill axially and the spindle therewith.

The hand wheel 71 rotates the externally threaded shaft 72 in threaded engagement with the nut 73 mounted against movement in the spindle carrying element G so that rotation of the hand wheel 71 moves the spindle carrying element longitudinally of the cross head F.

When the device is to be used for machining surfaces by means of machining tools held in the socket of the spindle H or by the lower end thereof, such as chucks and the like, the threaded shafts 72 may be drivingly connected with the vertical shaft 53 and clutch means may be introduced to stop and start the lateral feeding of the spindle H. When the spindle is not to move laterally, a conventional locking mechanism may be applied to retain the spindle carrying element against movement relative to the cross head.

The hand wheel 74 rotates the horizontal shaft 75 and the spiral gears 76 and 77 thereon that engage with companion gears on the externally threaded shafts 78 and 79 journaled in the tie bar E and the threaded part thereof engage the corresponding nuts 80 and 81 held against movement in the cross head F so that rotation of the hand wheel 74 moves the cross head vertically of the posts C and D for adjusting the cross head vertically.

When vertical feed of the cross head is desired in addition to the vertical feed of the spindle, as for boring by the spindle or machining a side of a work piece on the table by a machining tool in or on the lower end of the spindle, a power drive may be installed to establish a driving connection from the shaft 53 to the shaft 75. A conventional clutch means is preferably inserted to stop and start the power feeding of the cross head F.

*Description of the electrical system*

The motor I is reversible and has the three leads 82, 83 and 84 leading to the different below described switches. The main switch 85 is operated by the handles 86 and 87 mounted on opposite sides of the bed to primarily make and break the electric circuit to and from the leads 88, 89 and 90 of the source of electrical energy and the other switches are connected in the same main circuit.

The switch shown in Fig. 2, illustrative of the other switches, is a push button operated switch and has the base 92, preferably of electrically insulating material. The push button 93 slides axially in the base, has the switch operating stem 94 on one end thereof and the head part 95 on the other. The spring 96 is interposed between the head part 95 and the shoulder 97 in the base to normally tend to keep the switch open. When the head part 95 is pushed inwardly of the base, the switch is closed and will remain closed as long as pressure is exerted on the part but will automatically open when the pressure is released and the spring 96 moves the head part 95 axially. With such switches, the electrical circuit is made and broken easily and quickly and timely and no time needs to be lost in hunting for switches or cut outs. The switch 91 may be used to start and stop operation of the motor I. The switch 99 may be used to control vertical movement of the cross head. The switch 100 may be used to control the horizontal movement of the table. The switch 101 to control the horizontal movement of the spindle carrying head. This illustration teaches the use of push button switches on machines wherein one part moves relative to another and wherein easy and quick change is desired for stopping and starting relative movements between parts. This system uses only one motor to drive the spindle and the feeding mechanism and has switch means to stop and start the motor itself and the push button switches are so inserted that no part of the machine operates unless the respective push button switches are first pushed in and held so pushed in as long as desired but stops the operation as soon as the push button is released.

The reversing switch or pole changer 102 reverses the rotation of the motor and of the relating parts of the machine.

*General description of setting means*

The setting means is illustrated in Figs. 11, 12, 13, 14 and 15 and is shown as applied between the bed and the table in Fig. 1 and as applied between the cross head and the spindle carrying head in Fig. 6.

Figure 14:
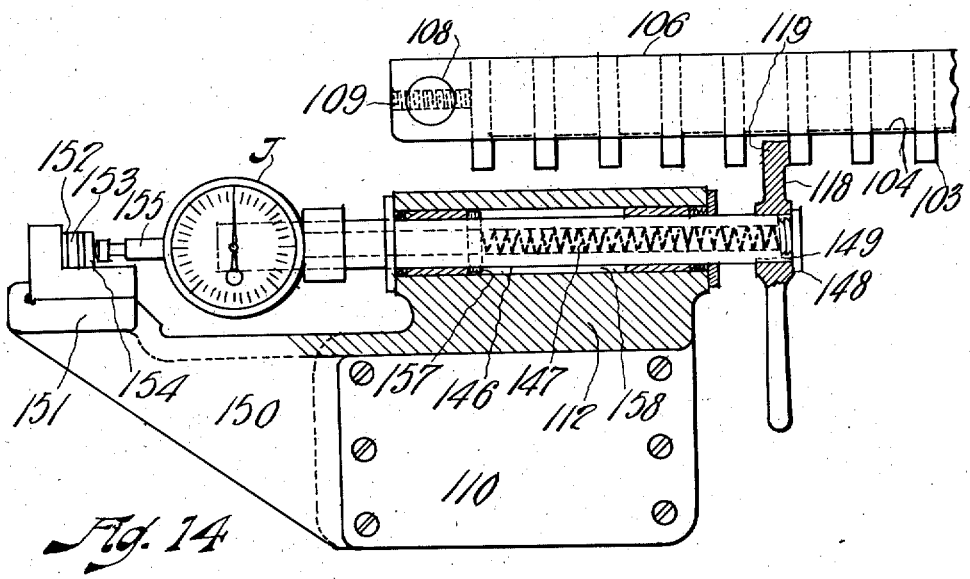
Fig. 14 is a fragmental section view of a modification of the precise setting means; the section being taken on the line 14—14 of Fig. 15.
Figure 15:
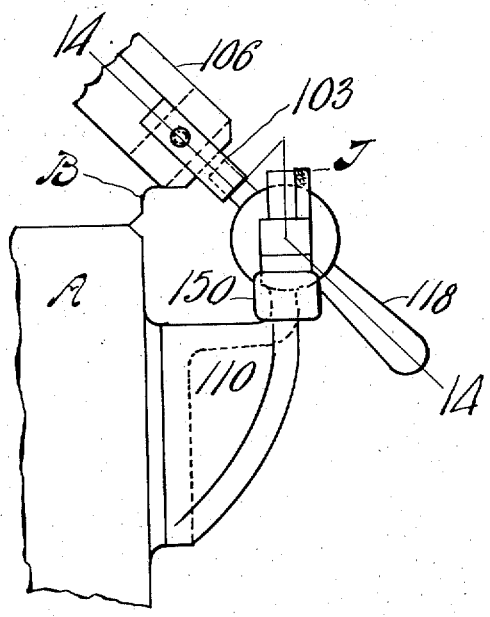
Fig. 15 is an end view of Fig. 14.

The blocks 103 and 104 are mounted in a part here being a part of the table B, here considered as being the movable and adjustable part of the machine and lie horizontally although the same may be vertical or inclined, the latter being shown in Figs. 14 and 15. The blocks 104 are shorter than the blocks 103 to form the slots 105 when assembled. It is preferred that each of the blocks is of the same width, say 0.5000" so that the distance from one slot to the next one is exactly 1.000". The plate 106 holds the blocks down onto the part B by means of the screws 107. The plug 108 is movably mounted in the part B and the screw 109 is threaded thereinto to abut the end of one of the end ones of the blocks for firmly holding the blocks against each other. This structure entails positionally fixed slots and blocks on an element which may itself be fixed positionally or may be movable. The plug 108 adjusts itself during tightening of the screw 109 and thereby prevents any of the blocks from being shifted by the tightening of the screw.

The bracket 110, shown as being secured to the bed A by means of the screws 111, has the boss 112 and the shaft or shank 113 journaled therein by means of the bushings 114. The bracket 115, shown as being secured to the bed A by means of the screws 116, has the boss 117 for mounting therein of the below described micrometer mechanism.

Figure 13:
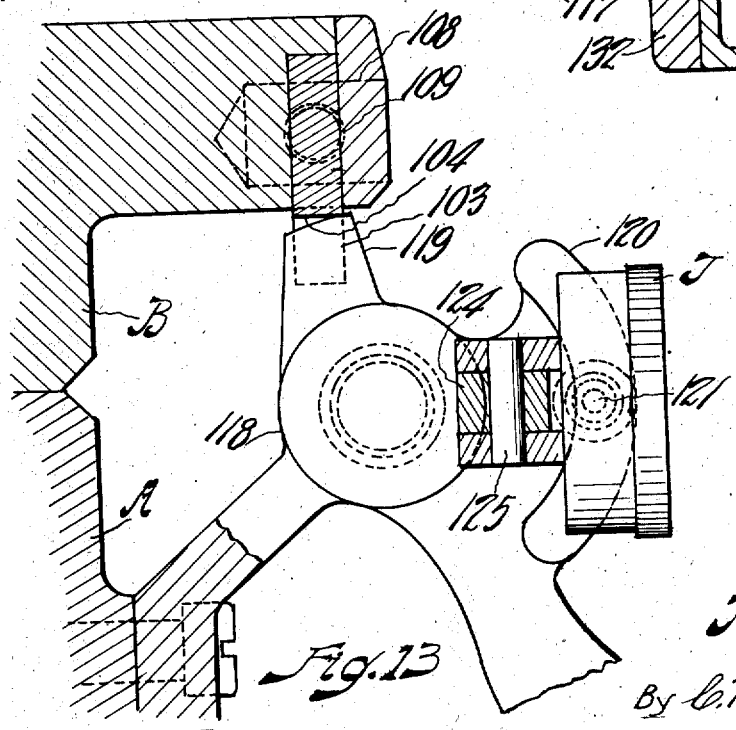
Fig. 13 is an enlarged section taken on line 13—13 of Fig. 11.

The finger 118 is part of the above mentioned shank 113, has the ear 119 to closely fit into any one of the slots 105 when in the position shown in Figs. 13 and 15 and also has the flange 120 exactly square with the axis of shank for abutment by the member 121 of the measure indication or showing instrument J.

The stub 122 is journaled in the boss 117 and has the slot 123 on the outer end thereof to receive the lug 124 of the instrument J pivotally held therein by the pin 125. This mounting of the instrument J affords a means for pivoting the instrument to bring its face and pointer 126 into easily readable position.

The inner end of the stub 122 is internally threaded to receive the inner end of the externally threaded stem 127 journaled in the bracket 117 and having the collar 128 abutting the bracket to prevent axial movement of the stem 127 in one direction. The outer end 129 of the stem carries the flanged sleeve 130 having the graduation marks 131 on the margin thereof to provide a means for reading a setting relative to the zero mark on the margin of the flange 132 abutting the flange 130. The pin 133 is secured to the sleeve 130 and to the part 129 of the screw 127 so that the former rotates with the latter. The nut 134 is threaded onto the outer end of the part 129 to hold the collar 128 against the sleeve 132 and hold the flange 130 against the flange 132. When the nut 134 is provided, it is preferred that the aperture for the pin 133 in the sleeve 130 be made oblong so that there will be no binding between parts.

The friction plug 135, mounted in the flange 130, is normally pressed against the flange 132 by means of the spring 136 mounted in the sleeve 130. The vernier mechanism K is mounted to cooperate with the micromical graduation to show more close reading and setting than by the micrometer graduations alone.

For setting the part B relative to the part G for boring, as well as for setting these and other elements relatively of the machine shown and described to bore two holes in a work piece on the table exactly 2.125" apart, the work piece is first put on the table and held thereon securely when ready for the boring thereof, suitable stop means for the work piece being provided to prevent the work piece from shifting, the object here being to locate the work piece relative to the table and to hold it there.

The finger is then moved longitudinally and pivotally so that the inner end thereof enters one of the slots. The micrometer mechanism is then set so that the pointer on the instrument J registers zero. The reading of the setting means is then noted. It is assumed that this reading will be: the finger in the third slot and the micrometer reading 486. The clamping means are then tightened to hold the table in relation to the bed and the cross head in relation to the posts and the spindle carrying head in relation to the cross head. The machine is then set for boring the first hole of the two. After the first hole is bored, the table is moved longitudinally when the second hole is to be bored straight back of the first one or straight in front thereof or the spindle carrying head is moved to one side in the manner above described when the second hole is to be located not straight back or in front of the one first bored. This manner of adjusting is for holes that are staggered relative to each other.

When the second hole is to be bored straight back of the first one, the finger is released from the third slot and the table is moved forward until the finger engages in the 7th slot when the blocks and slots are ½" wide. The micrometer is then set 486—125 equals 361; 486 being the former reading; 125 being the amount above the 2" finger setting. The table is then adjustably moved further until the pointer of the instrument J registers zero. The machine is then set for boring the second hole and the clamping means are then tightened to securely hold the machine elements in adjusted positions for boring the second hole.

This same manner of procedure can be carried out for relatively adjusting other parts of the machine.

When a second hole is to be bored back of and at one side of the first one, triangulation must be used to determine how far to move the adjustable elements since the moving thereof can be done only longitudinally of the machine and transversely thereof. Sides opposite and sides adjacent can easily be calculated when the hypotenuse is given, the triangle being a right-angled one, and the hypotenuse can easily be found when the both sides are given.

The general operation of the machine seems to need no special explanation since it follows the usual operations of machines of the same kind. Sufficient objects and descriptions have been given above to enable others to operate the machine.

A conventional clamping means is illustrated in Fig. 3 wherein the part B is clamped to the post C. The shaft 137 is mounted in the part B and traverses the pocket 138 and is rotated by means of the handle 139. The eccentric 140, mounted on the shaft 137, is located in the pocket 138 and abuts the shoe 141 which abuts the post C. Rotating the eccentric in one direction clamps the part B to the post without changing the axis of the post relative to the part B to preserve precision in the machine and rotation of the eccentric in the opposite direction releases the clamping. With this clamping means, the shoe 141 is moved and released by the eccentric and no other part of the machine need be moved nor is moved by the clamping.

The more or less conventional table adjusting means L is mounted on the bed, at one side near the forward end thereof for convenient reach of the hand wheel 142 by an operator near the micrometer mechanism. The stem or shaft 143 has the hand wheel secured to the rearward end thereof and the worm 144 to the forward end. The worm meshes with the worm wheel 145 secured to the shaft 141 for attaining precision adjustment of the table longitudinally of the bed. A clutch mechanism of conventional type is introduced between the handwheel and the worm wheel so that operation of the mechanism L can be stopped and started at will and the handwheel can be cut out of operation so that vibrations of the machine will not tend to rotate the screw while the machine is vibrating.

Figs. 14 and 15 show a modification of the above described precision parts setting means, using the same general principle but arranging the parts somewhat differently to effect an action that is an improvement in some respects over the parts setting means above described.

In this modification, the blocks 103 and 104 are used in the same manner as described above but are here mounted angularly for better sight thereof.

The bracket 110 and the boss 112 thereon are mounted similarly to the above description.

The stem or shaft 146 is axially movably mounted in bushings in the boss 112 and is hollow for the spring 147 to operate therein. The finger 118 is held onto one end of the shaft 146 by means of the screw 148 and is held against rotation thereon by the key 149. In this instance, the end 119 of the finger does not contact two of the adjacently located blocks but contacts one only and permits of contact on either one separately. This allows for some play of the shaft 146 in the boss 112.

The measure indicating instrument J is mounted on the other end of the shaft 146 as shown.

The bracket 110 here has the extension 150 and the shelf 151 mounted thereon. The insertable measure determining blocks 152, 153 and 154 are placed side by side on the shelf as needed as is indicated in the drawings and the shaft 155, projecting from the instrument J, abuts the outermost one. These blocks may be one or more in number and of various thicknesses and, these together, with the location of the finger against any one of the blocks determines the spacing that one element or part is set from another when the shaft 155 is in contact thereon.

One end of the spring 147 abuts the screw 148 and the other end abuts the pin 157 transversely through the shaft 146 and having both ends thereof projecting outside thereof and into the space 158 between the bushings in the boss 112.

The machine shown and described is simple of structure and the parts thereof are constructed and arranged and machined so that assembling of the machine is effected without manual fitting of the joined parts. The electric and mechanical control means are economical of structure and easy and convenient of access and operation and the joined parts are easily and conveniently held together and the clamping and releasing and adjusting of the parts is easily and conveniently effected by means on the outside of the machine.

Applicant is aware that the embodiment shown and described herein is not the only embodiment of the present invention and that various modifications can be made within the spirit and intent of the present invention and of the appended claims.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A machine tool having, in combination, a bed, a table movable in guided contact thereon and means for positioning said table relative to said bed comprising, a rack on said table and having equally spaced abutments for primarily setting said table approximately relative to said bed, a member longitudinally movably mounted on said bed and being movable parallel with the movement of said table, a measure showing instrument on the inner end of said member and having an abutment projecting therefrom, a second member longitudinally movably mounted on said bed and having a finger movable into contact with said abutment of said instrument and into and out of contact with any one of said first-named abutments, a micrometer mechanism to be set to a predetermined position of said table relative to any of said first-named abutments, and means for moving said table until said finger can move into position adjacent to a desired one of said first-named abutments and also for moving said table until said measure showing instrument registers zero for precise setting of said table relative to said base.

2. A machine tool having, in combination, a bed, a table movable thereon in guided contact, and means for positioning said table relative to said bed, comprising, equally spaced abutments on a side edge of said table, a micrometer mechanism mounted on said bed, a shaft mounted on said bed to move parallel with said table and oscillatory transversely thereof and having a contact member on one end thereof and being operated for parallel movement by said micrometer mechanism and for setting of the end of said contact member to a position required for a positioning of said table, a finger carried on said bed and being longitudinally movable parallel with said table and oscillatory movable transversely thereof and having a part engageable with and disengageable from any of said abutments on said table, and means for moving said table until said part of the finger engages the required one of said abutments on the table and also for moving said table until said finger contacts said contact member on the shaft for precise positioning of said table relative to said bed.

3. In combination, a bed, a table movable relatively to said bed and means for determining the relative position of said bed and said table comprising, equally spaced abutments on a side edge of said table, a finger on said bed movable relatively to said table and having a part engageable with any of said abutments, a micrometer mechanism carried by said bed, a part adapted to be set by said micrometer mechanism and engaged by said finger for determining a position of said table relatively to said bed, and means for moving said table relatively to said bed until said part of the finger is engageable with the desired one of said abutments and the finger contacts the position determining part set by said micrometer mechanism.

4. In a machine tool, the combination of a bed, a table movable relatively thereto, and means for determining the position of said table relatively to said bed, comprising, equally spaced abutments on said table, a movable finger on said bed having a part engageable with and disengageable from any of said abutments and a micrometrically adjustable means having a part adapted to contact said finger for setting said finger to a predetermined position with respect to the base, so that when the table is moved, said part of the finger can engage the corresponding one of said abutments.

5. In combination, a normally stationary bed element, cylindrical parallel posts upstanding therefrom and having the lower ends thereof anchored centralizing therein, a normally stationary cross element guided to move vertically on both of said posts, a spindle carrying member movable longitudinally on said cross head, a table member movably carried in contact with the top of said stationary bed element, a setting means for positioning said spindle carrying movable member relative to said normally stationary cross element, and setting means for positioning said movable table member relative to said bed element; each of said setting means comprising equally spaced abutments on a side edge of the movable member, a finger carried by the stationary element and movable parallel to the movable member and having a portion movable into and out of adjacency of each of said abutments, a part mounted on the stationary element and movable parallel to the movable member and contactable with said finger, a micrometer mechanism for moving said part into a setting determining position of the movable member, and means for moving the movable member until said portion of the finger can enter adjacent to the desired abutment on the movable member for approximate positioning of the movable member and also for moving the movable member until said portion of the finger contacts the desired abutment for precise positioning of the movable member relative to the stationary element.

6. Positioning means for the table of a machine tool comprising in combination, a support, a table movable thereon having abutments spaced equally in the direction of its movement, a micrometer on said support having its spindle parallel to the direction of movement of said table, a rod adapted to engage said micrometer and carried by said support and having a projection at one end thereof for engaging any of said abutments, said projection being rotatable into and out of abutment engaging position, and means to adjust the distance between the micrometer spindle and the projection, whereby the relative position of said table and support is determined by the engaged abutment and the adjustment of the micrometer.

7. Means for positioning relatively movable parts of a machine tool comprising in combination, abutments on one of said parts, a micrometer carried by the other of said parts and having the spindle thereof parallel to the direction of relative movement of said parts, and a finger movable in said direction and carried by one of said parts and adapted for abutting any of said abutments, said finger and said micrometer being adapted for engaging each other, whereby when said micrometer is suitably set and is engaged by said finger while said finger engages a preselected abutment, said parts will be accordingly positioned relative to each other.

8. In combination, a bed, a table movable relatively thereto, and means for determining the relative position of said bed and said table, said means comprising equally spaced abutments on said table, a finger movable along said abutments and carried by said bed for abutting any of said abutments, and micrometer mechanism carried by said bed and adapted for engaging said finger while the latter abuts any of said abutments, whereby when said finger engages a preselected abutment and also said mechanism, said parts are positioned relatively to each other in accordance with such preselected abutment and the reading of said mechanism.

9. The combination of two relatively movable parts, one of said parts being equipped with evenly spaced abutments, a movable finger adapted for entering the space between any two adjacent abutments and for abutting one of them, and a precise reading instrument micrometrically adjustably carried by the other of said parts and adapted for engaging said finger, whereby when said finger engages both said instrument and one of said abutments, the relative relation of said parts is determined by such one of said abutments and the reading of said instrument.

10. The combination of relatively movable parts, evenly spaced abutments on one and a precise showing instrument micrometrically adjustably carried by the other of said parts and a finger adapted for simultaneously abutting said instrument and any of said abutments whereby the abutment abutted by said finger and the showing of said instrument determine the relative position of said parts.

11. In a machine tool having, in combination, parts movable relatively to each other, one of said parts having equally spaced abutments for primarily setting said parts in approximate position relatively to each other, a member movably mounted on the other of said parts, a measure showing instrument mounted on said member, a micrometer mechanism for moving said member, and a finger adapted for simultaneously abutting said instrument and any of said abutments whereby the abutment abutted by said finger, the showing of said instrument and the reading of said mechanism all cooperate to determine the relative position of said parts.

12. The combination of parts movable relatively to each other, one of said parts having equally spaced abutments, the other of said parts having an abutment, a precise measure showing instrument adapted for engaging said last-named abutment, a finger adapted for engaging any of said first-named abutments, and means movably mounted on said other of said parts for interconnecting said finger and said instrument whereby the abutment of said first-named abutments engaged by said finger and the showing of said instrument while the latter engages said last-named abutment determine the relative position of said parts.

13. The combination of relatively movable parts, abutment means on one of said parts, a precise measure showing instrument adapted for abutting said means, micrometer means including a pair of discs for moving said instrument relatively to the other part whereby said parts can be precisely set relatively to each other, and a friction drag between said discs for preventing accidental relative movement of said discs.

14. The combination of relatively movable parts, abutment means on one of said parts, a precise measure showing instrument adapted for abutting said means, micrometer means including a pair of discs for moving said instrument relatively to the other part whereby said parts can be precisely set relatively to each other and means resiliently urging said discs apart for preventing accidental relative movement of said discs.

15. Positioning means for relatively movable parts comprising in combination abutments carried by one of said parts and spaced equally in the direction of relative movement of said parts, a micrometer on the other of said parts and having the spindle thereof parallel to the direction of said relative movement, a rod carried by one of said parts and having a projection at one end thereof adapted to engage said micrometer and any of said abutments, means to move said projection into and out of abutment engaging position, and means to adjust the distance between the micrometer spindle and the projection, whereby the abutment engaged by said finger and the adjustment of said micrometer while the latter is engaged by said finger determine the relative position of said parts.

JOSEPH VERDERBER.